(12) United States Patent
Schirtzinger

(10) Patent No.: US 9,840,984 B2
(45) Date of Patent: Dec. 12, 2017

(54) LINKAGE TO CONTROL AND RESTRAIN FLAP MOVEMENT

(71) Applicant: United Technologies Corporation, Hartford, CT (US)

(72) Inventor: Gary A. Schirtzinger, Glastonbury, CT (US)

(73) Assignee: UNITED TECHNOLOGIES CORPORATION, Hartford, CT (US)

( * ) Notice: Subject to any disclaimer, the term of this patent is extended or adjusted under 35 U.S.C. 154(b) by 734 days.

(21) Appl. No.: 14/459,752

(22) Filed: Aug. 14, 2014

(65) Prior Publication Data

US 2015/0053789 A1   Feb. 26, 2015

Related U.S. Application Data

(60) Provisional application No. 61/867,922, filed on Aug. 20, 2013.

(51) Int. Cl.
*F02K 1/12*   (2006.01)

(52) U.S. Cl.
CPC .................................. *F02K 1/1207* (2013.01)

(58) Field of Classification Search
CPC . F02K 1/1215; F02K 1/12; F02K 1/06; F02K 1/1207
USPC ...................................... 60/771; 239/265.39
See application file for complete search history.

(56) References Cited

U.S. PATENT DOCUMENTS

| | | | | |
|---|---|---|---|---|
| 2,934,966 A * | 5/1960 | Wood | F02K 1/1207 138/45 |
| 2,984,068 A * | 5/1961 | Eatock | F02K 1/1215 239/127.3 |
| 3,157,027 A * | 11/1964 | May | F02K 1/12 239/265.41 |
| 3,263,417 A * | 8/1966 | Hooker | F02K 1/12 244/207 |
| 3,564,934 A * | 2/1971 | McMurtry | F02K 1/1207 239/265.39 |
| 3,814,324 A * | 6/1974 | Wanger | F02K 1/12 239/127.3 |
| 3,892,358 A * | 7/1975 | Gisslen | F02K 1/805 239/265.39 |
| 3,988,889 A * | 11/1976 | Chamay | F02K 1/1207 239/265.39 |
| 4,043,509 A * | 8/1977 | McHugh | F02K 1/1269 239/265.41 |
| 4,128,208 A * | 12/1978 | Ryan | F02K 1/1207 239/265.39 |
| 4,420,932 A * | 12/1983 | Mendez | F02K 1/1207 239/265.39 |

(Continued)

*Primary Examiner* — William H Rodriguez
(74) *Attorney, Agent, or Firm* — Snell & Wilmer L.L.P.

(57) ABSTRACT

The present disclosure relates to systems for controlling movement of a divergent flap (24) in an exhaust nozzle (20). A nozzle flap assembly may include a first link (42) pivotably coupled to a divergent flap (24). A second link (40) may be pivotably coupled to the first link and a static portion (44) of the exhaust nozzle. The second link may comprise a bumper (50). The first link may be configured to contact the bumper in response to the divergent flap being in a high thrust mode. The second link may be configured to contact the divergent flap in response to the divergent flap being in a low thrust mode.

15 Claims, 3 Drawing Sheets

(56) References Cited

U.S. PATENT DOCUMENTS

| | | | | |
|---|---|---|---|---|
| 5,102,050 A | * | 4/1992 | Sedziol | F02K 1/12 239/265.35 |
| 5,511,376 A | * | 4/1996 | Barcza | F02K 1/008 239/265.35 |
| 6,299,077 B1 | * | 10/2001 | Harmon | F02K 1/1223 239/265.19 |
| 2005/0097893 A1 | * | 5/2005 | Carper | F02K 1/12 60/771 |
| 2005/0132709 A1 | * | 6/2005 | Gould | B23K 11/115 60/771 |
| 2008/0098742 A1 | * | 5/2008 | Sadil | F02K 1/82 60/770 |

* cited by examiner

LINKAGE TO CONTROL AND RESTRAIN FLAP MOVEMENT

CROSS-REFERENCE TO RELATED APPLICATIONS

This application is a nonprovisional of, and claims priority to, and the benefit of U.S. Provisional Application No. 61/867,922, entitled "LINKAGE TO CONTROL AND RESTRAIN FLAP MOVEMENT," filed on Aug. 20, 2013, which is hereby incorporated by reference in its entirety.

FIELD

The present disclosure relates generally to turbine engines. More particularly, the present disclosure relates to systems for controlling flaps of an exhaust nozzle.

BACKGROUND

Conventional aircraft engines, such as gas turbine engines, typically include a compressor, a combustor, and a turbine. Compressed air mixed with fuel in the combustor generates a flow of hot gases. The hot gases flow through the turbine and expand against a plurality of turbine blades. The turbine blades transform the expansion of hot gases into mechanical energy for driving a rotor shaft that in turn drives the compressor. The hot gases exit the engine through an exhaust nozzle to provide thrust to the aircraft.

Conventional exhaust nozzles are adjustable such that the size of the area through which the hot gases flow changes with changing exhaust flow pressure. The size of the exhaust area is proportional to the thrust that the engine produces. During take-off for example, more thrust is desired than during cruising and therefore a larger exhaust area is desirable. Further, the amount of thrust that the engine produces is related to the amount of fuel that the engine combusts. As a result, adjusting the size of the nozzle for take-off and cruising conditions to provide a desired amount of thrust can increase fuel efficiency.

Conventional exhaust nozzle assemblies include a plurality of adjustable flaps that move in response to changing exhaust flow pressures. To maintain stable movement of the flap, the flap typically includes a slot to guide the flap as it moves. A strut having one end fixed to the engine and another end received in the slot allows flap movement along the slot and prevents significant movement in other directions to stabilize the flap.

SUMMARY

According to various embodiments, a nozzle flap assembly is disclosed. The nozzle flap assembly may comprise a nozzle flap and a first link coupled to the nozzle flap. A second link may be coupled to the first link. The second link may comprise a bumper configured to selectively contact the first link to limit movement of the nozzle flap. The bumper may extend from a lower surface of the second link. The first link may comprise a flap section and a bumper section. The flap section may be configured to contact the nozzle flap in response to the nozzle flap moving to a maximum inward position in a low thrust mode, and the bumper section may be configured to contact the bumper in response to the nozzle flap moving to a maximum outward position in a high thrust mode.

According to various embodiments, an exhaust nozzle is disclosed. The exhaust nozzle may comprise a convergent flap and a divergent flap. The divergent flap may be pivotably coupled to the convergent flap. The divergent flap may be mounted for movement to vary an exhaust area of the exhaust nozzle. A first link may be pivotably coupled to the divergent flap. A second link may be pivotably coupled to the first link and a static portion of the exhaust nozzle. The second link may comprise a bumper, and the first link may be configured to contact the bumper in response to the divergent flap moving to a maximum outward position in a high thrust mode. The first link may be configured to contact the divergent flap in response to the divergent flap moving to a maximum inward position in a low thrust mode.

According to various embodiments, a system for restricting movement of a nozzle flap is disclosed. The system may comprise a first link comprising a flap section and a bumper section. The system may comprise a second link coupled to the first link, wherein the second link comprises a bumper. The bumper of the second link may be configured to selectively contact the bumper section of the first link to limit rotation of the first and second links relative to one another.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized, and that logical and mechanical changes may be made without departing from the spirit and scope of the inventions. Thus, the detailed description herein is presented for purposes of illustration only and not for limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

Figure 1:
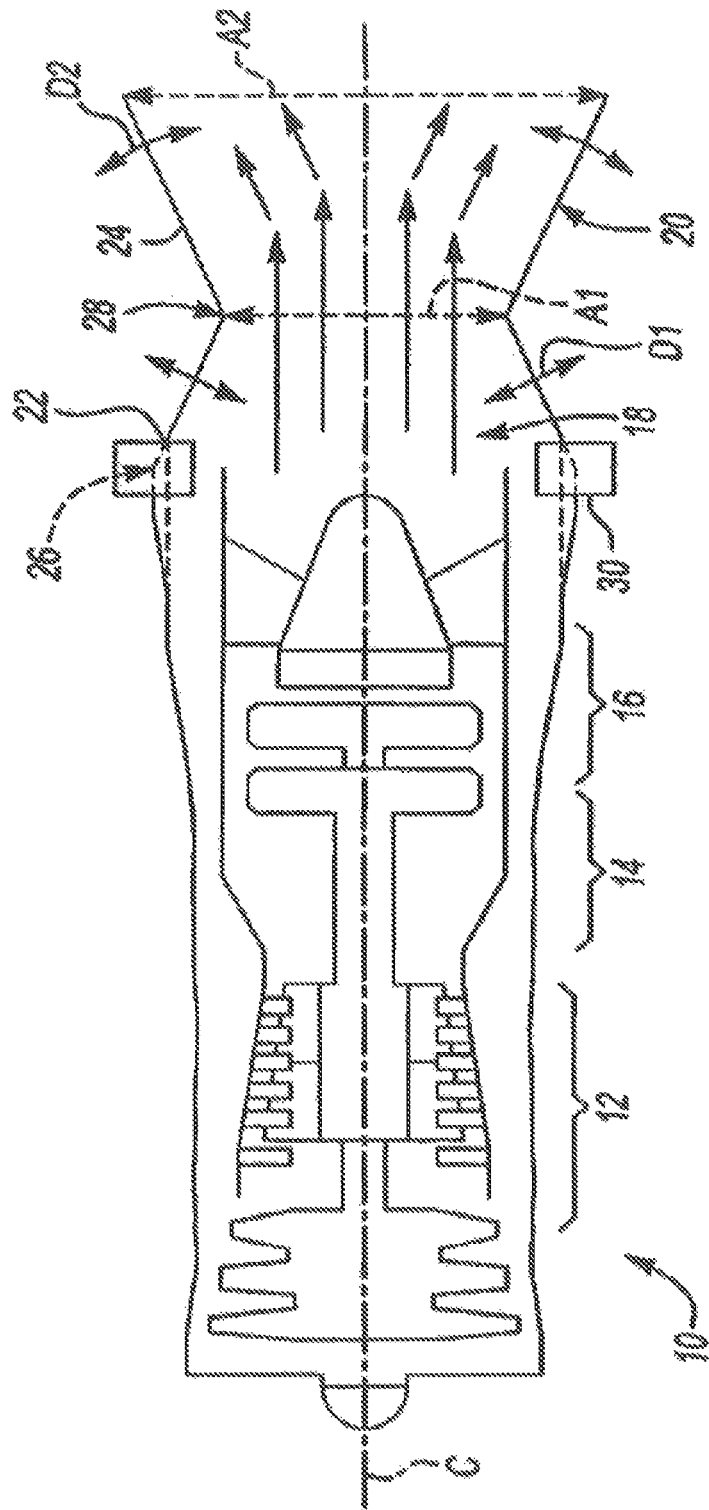
FIG. 1 illustrates a schematic axial cross-section view showing a gas turbine engine according to various embodiments of the disclosure.

Referring to FIG. 1, a gas turbine engine 10, such as a turbofan gas turbine engine, is illustrated according to various embodiments. Gas turbine engine 10 may include a compressor 12, a combustor 14, and a turbine 16. Gas turbine engine 10 may feed compressed air from compressor 12 to combustor 14. The compressed air may be mixed with fuel and ignited to produce a flow of hot gases 18. Turbine 16 may transform the flow of hot gases 18 into mechanical energy to drive compressor 12. An exhaust nozzle 20 directs the hot gases 18 out of gas turbine engine 10 to provide thrust for an aircraft.

The forward-aft positions of gas turbine engine 10 lie along engine central axis C, which may also be referred to as axis of rotation C. For example, compressor 12 may be referred to as forward of turbine 16 and turbine 16 may be referred to as aft of compressor 12. Typically, during operation of gas turbine engine 10, air flows from forward to aft, for example, from compressor 12 to turbine 16. As air flows from compressor 12 to the more aft components of gas turbine engine 10, engine central axis C may also generally define the direction of the air stream flow.

In various embodiments, exhaust nozzle 20 includes nozzle flaps 22, 24. Nozzle flaps 22, 24 may comprise convergent flaps 22 and divergent flaps 24. Convergent flaps 22 may converge toward engine central axis C and may be pivotable along a direction D1 to change the size of a jet area A1. Divergent flaps 24 may diverge from the engine central axis C and may be moveable along a direction D2 to change the size of an exit area A2.

Convergent flaps 22 may pivot about a first hinge 26, and divergent flaps 24 may pivot about a second hinge 28 along the respective directions D1 and D2. Actuators 30 may selectively pivot convergent flaps 22 toward the engine central axis C to reduce the size of the jet area A1 and outward relative to the engine central axis C to increase the size of the jet area A1. Divergent flaps 24 may move outward relative to the engine central axis C in response to the exhaust pressure of hot gases 18 being relatively high. Conversely, divergent flaps 24 may move inward relative to the engine central axis C in response to the exhaust pressure of hot gases 18 being relatively low. Movement of divergent flaps 24 outward (i.e., away from central axis C) may increase the size of the exit area A2 and movement of divergent flaps 24 inward (i.e., toward central axis C) may decrease the size of the exit area A2. Divergent flaps 24 may have a range of possible movement, represented by the ends of the direction arrow D2. The ratio between the size of the exit area A2 and the size of the jet area A1 may correspond to the thrust that gas turbine engine 10 produces. The present disclosure may extend to all types of turbine engines, including turbofan gas turbine engines, turbojet engines, turboshaft engines, ram jet engines, scramjet engines, and rockets for all types of applications.

Figure 2:
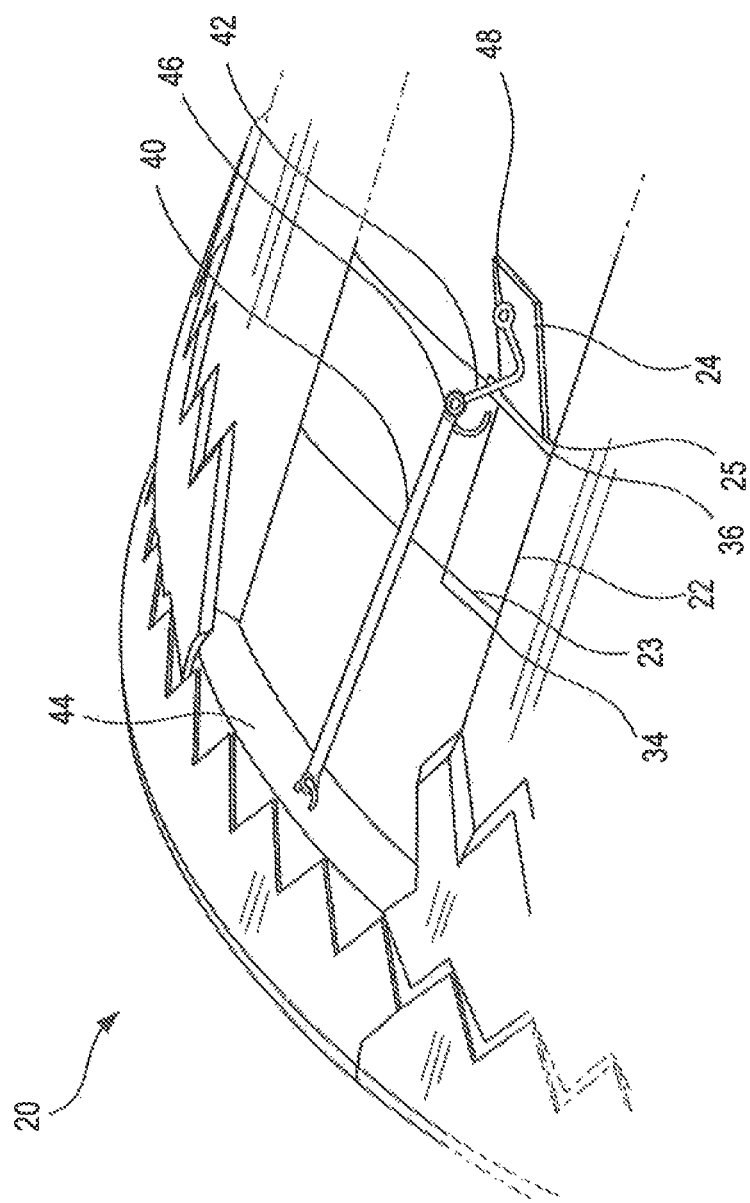
FIG. 2 illustrates a perspective view of a portion of an exhaust nozzle of a gas turbine engine according to various embodiments.

Referring to FIG. 2, a portion of an exhaust nozzle 20 is illustrated according to various embodiments. Exhaust nozzle 20 may comprise convergent flap 22 and divergent flap 24. A forward end 23 of convergent flap 22 may pivot at first hinge 34. A forward end 25 of divergent flap 24 may be coupled to convergent flap 22 at second hinge 36. Divergent flap 24 may pivot relative to convergent flap 22 at second hinge 36. Exhaust nozzle 20 may further comprise upper link 40 and lower link 42. In various embodiments, upper link 40 may be coupled to a static portion 44 of exhaust nozzle 20. Upper link 40 and lower link 42 may be coupled at link pivot 46. Link pivot 46 may allow upper link 40 and lower link 42 to pivot relative to each other. In various embodiments, link pivot 46 may comprise one or more bearings. However, in various embodiments, link pivot 46 may comprise a coated surface which decreases friction between upper link 40 and lower link 42. Lower link 42 may be coupled to divergent flap 24 at flap joint 48. Lower link 42 may pivot relative to divergent flap 24 at flap joint 48.

Figure 3:
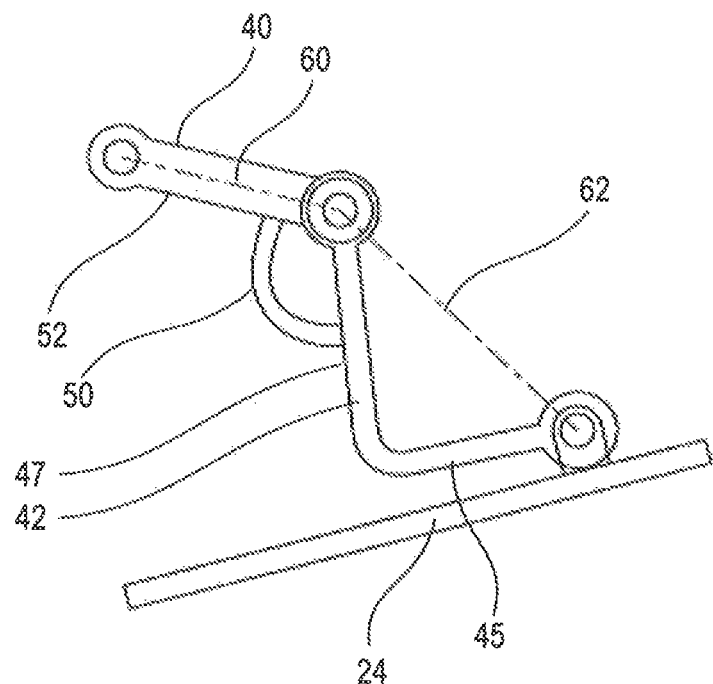
FIG. 3 illustrates a cross-section view of a divergent nozzle flap in a high thrust mode according to various embodiments.

Referring to FIG. 3, divergent flap 24 is illustrated in a high thrust mode according to various embodiments. The high thrust mode may correspond to instances of relatively high exhaust pressure. In the high thrust mode, the relatively high exhaust pressure may cause divergent flap 24 to pivot outward to a maximum outward position relative to the engine central axis C shown in FIG. 1. In the high thrust mode, lower link 42 may contact bumper 50 of upper link 40 if divergent flap 24 pivots outward to the maximum outward position in the high thrust mode. In this manner, bumper 50 can function as a stop which prevents further outward movement of the divergent flap 24 beyond the maximum outward position as further discussed below.

Upper link 40 is configured to transmit force in a longitudinal direction along line of action 60, and lower link 42 is configured to transmit force along line of action 62 on account of its coupling to flap joint 48 as shown. As used herein, a "line of action" may refer to the direction of a force that a first component applies to a second component. For example, upper link 40 may apply a force to lower link 42 at link pivot 46 along upper link line of action 60. Similarly, lower link 42 may apply a force to upper link 40 along lower link line of action 62, and lower link 42 may apply a force to divergent flap 24 in the direction of lower link line of action 62.

In various embodiments, lower link 42 may comprise a flap section 45 and a bumper section 47. In various embodiments, flap section 45 may be configured to contact divergent flap 24 in a low thrust mode, and bumper section 47 may be configured to contact bumper 50 in a high thrust mode. In various embodiments, bumper section 47 may be configured substantially perpendicular to flap section 45. However, in various embodiments, lower link 42 may comprise any shape wherein at least a portion of lower link 42 extends outside of lower link line of action 62 and wherein a portion of lower link 42 is configured to contact divergent flap 24.

In various embodiments, bumper 50 may extend from a lower surface 52 of upper link 40. As illustrated, bumper 50 may comprise a curved member extending from upper link 40. However, in various embodiments, bumper 50 may comprise any shape suitable to make contact with lower link 42. In response to bumper 50 contacting lower link 42, bumper 50 may prevent further rotation of lower link 42 relative to upper link 40. By preventing further rotation of lower link 42 relative to upper link 40, lower link 42 may in turn prevent further outward movement of divergent flap 24. For example, it will be appreciated that outward movement of divergent flap 24 transmits force to link pivot 46 along line of action 62 via lower link 42, causing relative upward movement of link pivot 46 and rotational movement of links 40, 42 toward one another. Once bumper 50 contacts link 42, links 40, 42 cannot rotate toward one another, and link pivot 46 cannot move upward. Thus, outward movement of divergent flap 24 is prevented. In various embodiments, lower link 42 does not contact divergent flap 24 in the high thrust mode.

Figure 4:
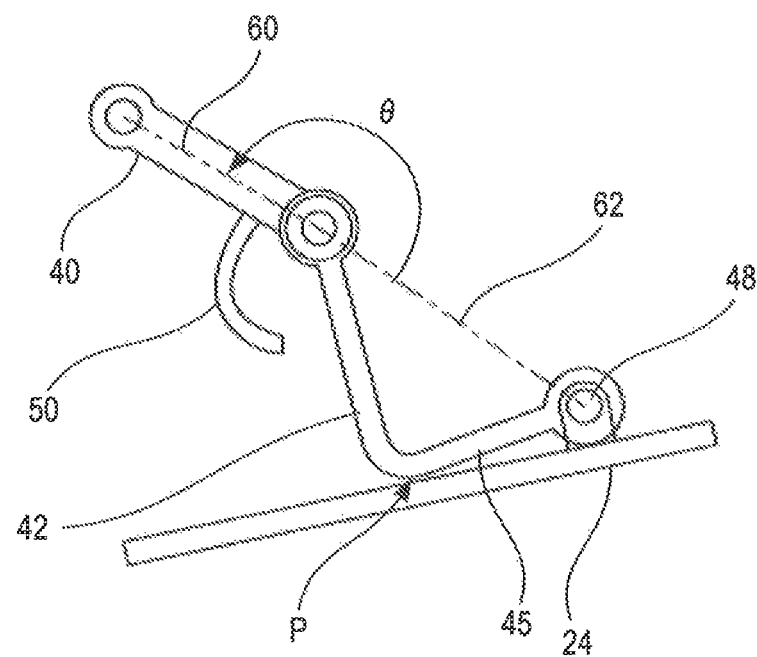
FIG. 4 illustrates a cross-section view of a divergent nozzle flap in a low thrust mode according to various embodiments.

Referring to FIG. 4, divergent flap 24 is illustrated in a low thrust mode according to various embodiments. The low thrust mode may correspond to instances of relatively low exhaust pressure. In the low thrust mode, divergent flap 24 may be located at a maximum inward position relative to the engine central axis C shown in FIG. 1. In the low thrust mode, lower link 42 may contact divergent flap 24 at contact point P. In various embodiments, flap section 45 of lower link 42 may contact divergent flap 24 at contact point P. In response to lower link 42 contacting divergent flap 24 at contact point P, lower link 42 may effectively comprise a lever with a fulcrum at contact point P. The lever may result in an upward force at flap joint 48 which may prevent divergent flap 24 from further movement toward the engine central axis C. Thus, lower link 42 may be prevented from rotating further in the counter-clockwise direction with respect to divergent flap 24, which may prevent link pivot 46 from moving toward the engine central axis C. In various embodiments, lower link 42 does not contact bumper 50 in the low thrust mode.

In various embodiments, an angle θ between upper link line of action 60 and lower link line of action 62 may be at a minimum in the low thrust mode. In the low thrust mode, the minimum angle θ may be greater than 180 degrees. Angle θ may increase as divergent flap 24 moves toward the high thrust mode. Thus, in various embodiments, angle θ is never 180 degrees or less, and thus, in various embodiments, upper link line of action 60 and lower link line of action 62 are never aligned, which may prevent locking of upper link 40 and lower link 42.

In various embodiments, upper link line of action 60 and lower link line of action 62 do not align at any point between the high thrust mode and the low thrust mode. In other words, in various embodiments, upper link line of action 60 and lower link line of action 62 may always be non-parallel regardless of the position of divergent flap 24. Preventing alignment of upper link line of action 60 and lower link line of action 62 may prevent a situation wherein the force applied on lower link 42 by upper link 40 and the force applied on upper link 40 by lower link 42 are directly opposite and cancel each other out. This could result in upper link 40 and lower link 42 becoming "locked", wherein lower link 42 does not pivot relative to upper link 40, which could prevent divergent flap 24 from extending from the low thrust mode to the high thrust mode.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A nozzle flap assembly comprising:
   a nozzle flap;
   a first link coupled to the nozzle flap; and
   a second link coupled to the first link, wherein the second link comprises a bumper configured to selectively contact the first link to limit movement of the nozzle flap.

2. The nozzle flap assembly of claim 1, wherein the bumper extends from a lower surface of the second link.

3. The nozzle flap assembly of claim 1, wherein the first link comprises a flap section and a bumper section, wherein the flap section is configured to contact the nozzle flap, and wherein the bumper section is configured to contact the bumper.

4. The nozzle flap assembly of claim 1, wherein the first link is pivotally coupled to the second link.

5. The nozzle flap assembly of claim 1, wherein the first link is configured to contact the bumper in response to the nozzle flap moving to a maximum outward position in a high thrust mode.

6. The nozzle flap assembly of claim 1, wherein the first link is configured to contact the nozzle flap in response to the nozzle flap moving to a maximum inward position in a low thrust mode.

7. The nozzle flap assembly of claim 1, wherein the nozzle flap is a divergent nozzle flap.

8. An exhaust nozzle comprising:
   a divergent flap mounted for movement to vary an exhaust exit area of the exhaust nozzle;
   a first link pivotably coupled to the divergent flap; and
   a second link pivotably coupled to the first link and a static portion of the exhaust nozzle, wherein the first link is configured to contact the divergent flap in response to the divergent flap moving to a maximum inward position in a low thrust mode, and
   wherein the first link is configured to transmit force along a first line of action, the second link is configured to transmit force along a second line of action, and the first and second lines of action are transverse to one another, wherein an angle between the first and second lines of action is greater than 180 degrees.

9. The exhaust nozzle of claim 8, wherein the second link comprises a bumper configured to selectively contact the first link to limit movement of the divergent flap.

10. The exhaust nozzle of claim 9, wherein the first link is configured to contact the bumper in response to the divergent flap moving to a maximum outward position in a high thrust mode.

11. The exhaust nozzle of claim 9, wherein the bumper extends from a lower surface of the second link.

12. The exhaust nozzle of claim 9, wherein the divergent flap is pivotably coupled to a convergent flap.

13. A system for restricting movement of a nozzle flap comprising:
a first link comprising a flap section and a bumper section; and
a second link coupled to the first link, wherein the second link comprises a bumper,
wherein the bumper of the second link is configured to selectively contact the bumper section of the first link to limit rotation of the first and second links relative to one another,
wherein the system is configured to restrict movement of a divergent flap between a maximum outward position and a maximum inward position,
wherein, in response to the divergent flap being in the maximum outward position, the first link is configured to contact the bumper, and in response to the divergent flap being in the maximum inward position, the first link is configured to contact the divergent flap, and
wherein the divergent flap is pivotably coupled to a convergent flap.

14. The system of claim 13, wherein the first link is coupled to a divergent flap, and wherein the second link is coupled to a static portion of an exhaust nozzle, and wherein the first link is pivotably coupled to the second link.

15. The system of claim 13, wherein the flap section and the bumper section are substantially perpendicular.

* * * * *